July 14, 1970    J. MOLITORISZ    3,520,250
ROLL PRESS FOR COMPACTING FODDER
Filed Oct. 17, 1967    3 Sheets-Sheet 1

Inventor:
Joseph Molitorisz
BY *[signature]*
ATTORNEY

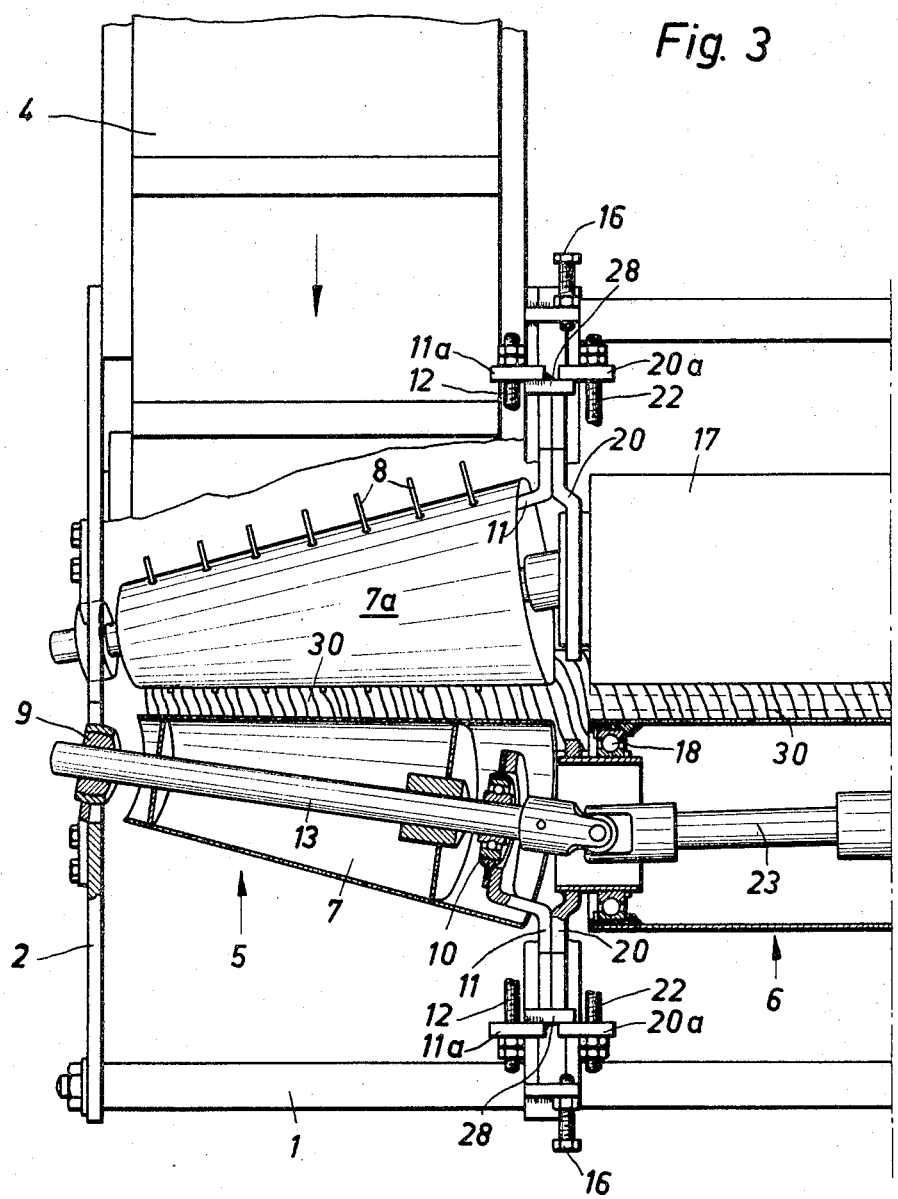

United States Patent Office 3,520,250
Patented July 14, 1970

3,520,250
ROLLER PRESS FOR COMPACTING FODDER
Joseph Molitorisz, Wolfenbuttel, Germany, assignor to
Fa. Gebrueder Welger, Wolfenbuttel, Germany
Filed Oct. 17, 1967, Ser. No. 675,807
Claims priority, application Germany, Oct. 27, 1966,
W 42,682
Int. Cl. B65b 37/08
U.S. Cl. 100—89                                            7 Claims

ABSTRACT OF THE DISCLOSURE

Compressing and winding rollers define a compressing and winding space between them. Smoothing and consolidating rollers define a smoothing and consolidating space aligned with the compressing and winding space. Fodder is fed laterally into the compressing and winding space and proceeds longitudinally as a compacted strand through the two spaces. Certain of the rollers from both the above sets are laterally movably mounted to provide an ability to vary the cross-sectional size of the respective spaces. The movable rollers are spring-biased laterally inwardly to exert a pressure on fodder being compacted and to provide a resilient giving of the rollers. An entrainment catch on the mount of the movable compressing and winding rollers brings the movable smoothing and consolidating rollers with the movable compressing and winding rollers upon laterally outwards movement of the movable compressing and winding rollers, while the compressing and winding rollers can move freely laterally inwards, irrespective of the lateral position of the movable smoothing and consolidating rollers.

FIELD OF THE INVENTION

The present invention relates to apparatus in which material is compressed between bodies having pressure surfaces and at least one of the bodies has a continuous pressure surface which rotates circularly about an axis with respect to the material and successive portions of the surface engage the material in rolling contact therewith.

More particularly, the present invention relates to roller type implements for compressing, baling and especially caking harvested fodder material such as hay. These implements comprise compressing and winding rollers which define an elongated winding and rolling space between their facing, external surfaces. During operation, material to be baled is introduced laterally into this space. The material leaves the space in the direction of elongation in the form of a strand whose diameter depends on the separation of the rollers. In addition, means are provided for then consolidating and externally smoothing the strand and for driving the compressing and winding rollers and the consolidating and smoothing means positively together.

DESCRIPTION OF THE PRIOR ART

Roller type baling implements are known in which fibrous harvested material is wound between canvas sheets to form a cylindrical roll or bale which is then wound with binder twine and ejected. These presses operate discontinuously and are only suitable for low density rolled bales.

In order to produce such rolled bales of harvested material continuously, a previously proposed machine has two rollers for continuously pressing material taken up, for example, from a swath, to form a flat band which is then wound up about a stationary mandrel by means of radially tilting shaping blades arranged on the front face of a cylindrical shaping chamber. The shaping blades have driven canvas sheets and are pressed inwards by means of springs. The increasing diameter of the material wound on the mandrel presses the blades in an outward direction and the wound bale simultaneously passes against the resistance of elastic braking blades in an axial direction to a compressing chamber. The latter is formed by driven, elastically mounted, pressing rollers and stationarily mounted pressing arms, which run over the surface of the wound strand and are pressed radially inwards. The strand compressed in this manner then passes in an axial direction from the compression chamber into a severing and binding chamber in which a bale is severed from the strand and then bound with twine. Apart from the comparative length, the relatively complicated construction and substantial power requirement of this previously proposed baler, it has been found in practice that the wound and shaped strand cannot be sufficiently compacted in its compression chamber. There is also the disadvantage with this known implement that it is not possible to smooth the strand and thereby compact its surface, so that special tying means (twine) is required to hold the bale together.

Another previously proposed baler operates such that harvested material is passed laterally into a winding and compressing chamber defined by positively driven winding and compressing rollers whose axes are fixed. The wound strand emerges axially from the chamber into a cylindrical smoothing channel rotating synchronously with the rollers. It has been found that, with this known winding or roller type baler, the pressed strand is suitably shaped and has sufficient strength or firmness of its own so that bales from it do not require binding or other means to keep them together. The bales are comparatively stable as regards shape.

In accordance with a further prior proposal it was shown to be possible, surprisingly, to produce fodder cakes with the last-named type of baling implement. These cakes could be produced, ready for consumption, from fibrous fodder material with a substantially lower power requirement than in the case of known fodder cake pressing equipment and without the inconvenient limitation to a narrow range of moisture content in the harvest material charge for the production of such fodder cakes.

It has been previously proposed in connection with balers and fodder cake presses to control the density of the compressed fodder by varying the cross-section of the pressing channel automatically. A certain degree of control is also obtained in the above described, roller type baler due to the resiliency of the shaping blades mount and the compressing rollers. This control is however very inaccurate and only reacts slowly to variations in the density of the compressed strand. This known control system may have been satisfactory for the wound or rolled bales produced with the known baler. For the production of pressed fodder of high density, more particularly fodder cakes, it is not capable of preventing blockage of the press, nor is it capable of ensuring an even strength or firmness of the pressed fodder.

SUMMARY OF THE INVENTION

It is an object of the invention to overcome these difficulties and to make the strength and more particularly the surface strength and smoothness of individual pressed bales or cakes more uniform in the case of a roller type baling implement.

In order to achieve this object the present invention provides an implement comprising compressing and winding rollers defining an elongated winding and compressing space, into which, in operation, material to be baled is introduced laterally. The material leaves the space in a direction parallel to the axis of the space, in the form of a strand. Further provided are means for consolidating and externally smoothing the strand and means for driving the compressing and winding rollers and the consolidating and smoothing means positively together. The implement of the invention is characterized in the following ways: the consolidating and smoothing means comprises rollers; at least one of the compressing and winding rollers can be moved so as to increase the lateral dimensions of the winding and compressing space; the movement of the compressing and winding rollers is resiliently opposed; the implement further comprises means to cause such movement of the one rolling and winding roller to be accompanied by a movement of a movable smoothing and consolidating roller also outwards to increase the cross-section of the space through which the strand moves.

As was the case with the winding type baler of the above mentioned, prior art type, the baling implement of the present invention consolidates the fodder material during the winding operation to provide the high degree of firmness (i.e. strength) required. In order to bring about further smoothing of the compressed strand, possibly after it has been divided into bales, and to consolidate it in its surface layers and thus increase its resistance to deformation without the use of binder twine or the like, positively driven smoothing rollers are preferably used in the baling implement of the invention, instead of a rotating compression channel. In order to compensate for variations in strength at least one winding and compressing roller and at least one smoothing roller are arranged, preferably, to yield resiliently. The high accuracy and sensitivity of control with regard to bale or cake strength is however only achieved when the size of the passage through which the fodder passes in the smoothing means is controlled by means of the opening action of the winding and compressing rollers. As soon as the reaction pressure in the compressing space exceeds a certain value at least one compressing roller begins to yield in a radially outward direction. Simultaneously, opposition to travel of the strand through the smoothing means is reduced so that the reaction force in the compression chamber or space sinks to the desired value determined by a particular radial setting of the movable winding and compressing roller.

For this highly accurate and sensitive control of the invention, the winding and compressing roller is required to move only through a small lateral distance, since the effect of such movement is reinforced by the simultaneous movement of the coupled smoothing roller. There results an automatic and rapidly responding control of the strength or firmness. At the same time, despite the lateral movement of at least one of the winding and compressing rollers, the compressed strand easily passes into the smoothing part of the implement. The construction in accordance with the invention can also be used with winding and compressing rollers which provide a forward thrust on the strand by their skew placement. The skew angle can be adjusted by the operator or automatically in accordance with the reaction force in the compressing space.

In order to prevent the position of the movable winding and compressing rollers from being affected by the reaction force in the smoothing station and resulting outward movement of the smoothing rollers, a control device is preferably provided between the smoothing and associated winding and compressing rollers. This device is only effective in the opening direction of the winding and compressing rollers and ensures that the movement of the smoothing rollers does not influence the compressive action in the pressing chamber or space defined by the winding and compression rollers.

Implements embodying the invention are suitable for use with fibrous fodder, such as hay, partially made hay, or green material. The power requirement for the implement is comparatively small and stable fodder cakes can be produced usually no matter what the moisture content of the starting material.

Other objects and many of the attendant advantages of this invention will be readily appreciated as the same becomes better understood by reference to the following detailed description when considered in connection with the accompanying drawings in which like reference numerals designate like parts throughout the figures thereof.

BRIEF DESCRIPTION OF THE DRAWING

FIG. 3 shows a longitudinal section through the front part of the implement along the line of section III—III of FIG. 2.

DESCRIPTION OF THE PREFERRED EMBODIMENTS

Figure 1:
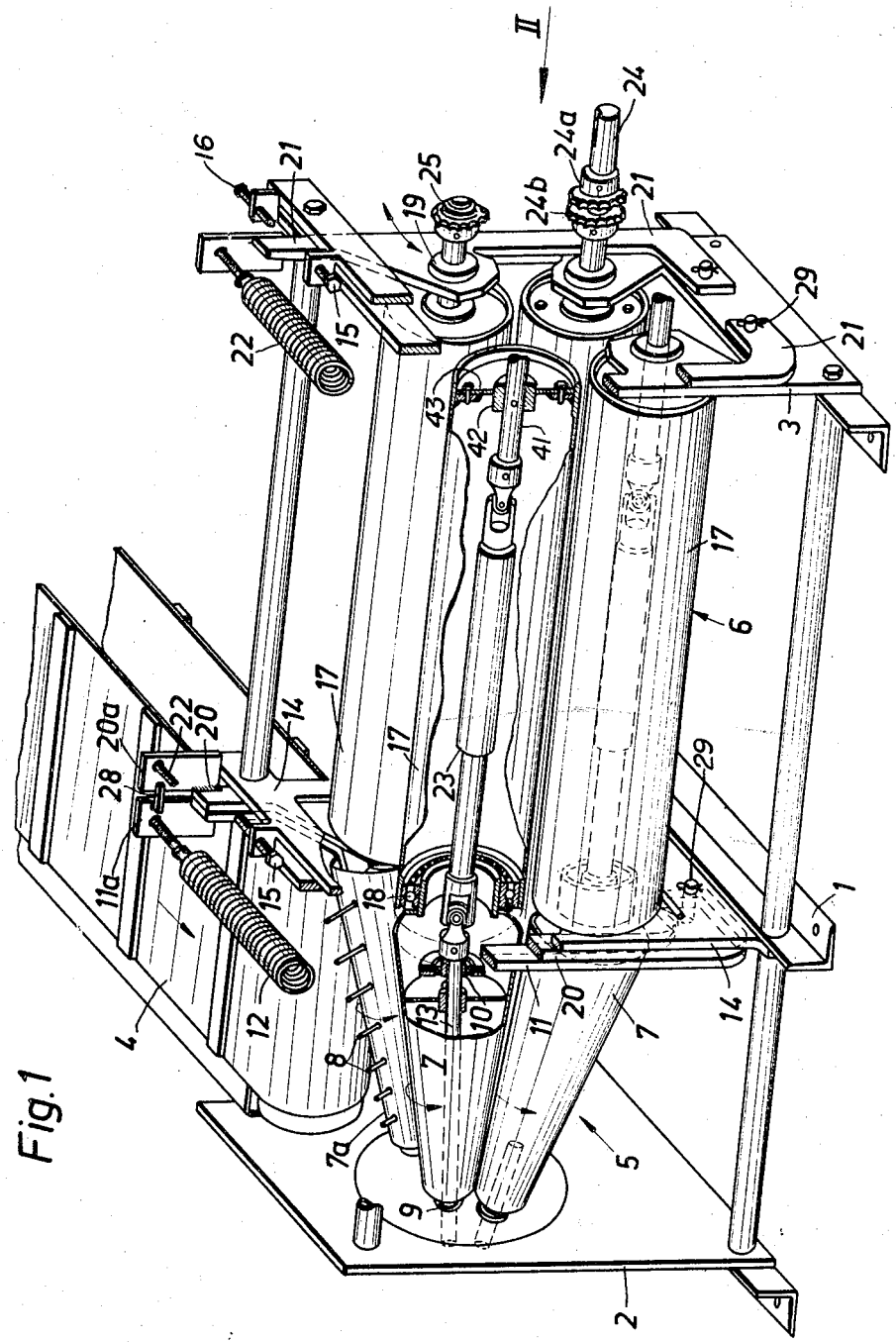
FIG. 1 shows the novel implement embodying the invention in perspective view obliquely from above, some parts being broken away or shown in section in order to facilitate understanding of the invention.

The implement in accordance with the invention is designed primarily to form part of a travelling harvesting machine. That is to say, it may be mounted on a travelling frame and combined with a collector and a transporter of the harvested material. In FIG. 1 a transporter is shown diagrammatically in the form of a conveyor band 4 provided with slats and serving to move the harvested material laterally and downwards into the implement of the invention.

The implement includes a frame 1 with two end plates 2 and 3. These serve to support the other components of the implement. Between the end plates 2 and 3 there is a further central support plate 14. The winding and compressing part 5 of the implement is situated between plates 2 and 14, while plates 3 and 14 bound the smoothing part 6.

The winding and compressing part 5 includes a compressing space or chamber which is delimited by the mutually facing external surfaces of the four winding and compressing rollers 7. This compressing chamber has a lateral, upper inlet for the harvested material brought by the conveyor band 4. This inlet is defined by the mutually facing surfaces of the upper two rollers. In order to promote movement of harvested material into the compression chamber the upper roller 7a is provided with tines 8 which protrude from its surface and, due to rotary movement of the roller, engage harvested material delivered by the conveyor band 4 and move it into the inlet gap between roller 7a and the adjacent roller 7. On further movement into the compressing chamber, the tines are withdrawn within the casing of the roller 7a.

The winding and compressing rollers 7 shown in the drawings are conical and define between them a frusto-conical compression chamber or space. The rollers can however be of other shapes; for example, they can be cylindrical or have sides bulging inwards or outwards. Their axes can be parallel or oblique to the axis of the compression chamber formed between them. The axes of the rollers can however also be oblique to the peripheral surface defining the compression space or they can be non-coplanar to the longitudinal axis of the compression space. In such a case it is advantageous to provide means for varying the skew, that is to say non-coplanar, positions of the roller axes manually or automatically, preferably in accordance with the compressing force being exerted in the compression space.

In the embodiment shown, the two upper rollers 7 are arranged so that they can be moved laterally outwards and inwards to vary the lateral or cross-sectional dimensions of the compression space between them. As illustrated in FIGS. 1 and 3, for this purpose the movable rollers have their front ends mounted in self-aligning bearings 9 while their other ends are held by means of bearings 10 which are mounted in pivoting frames 11.

These frames are pivoted at their lower ends about pins 29 mounted on the intermediate support plate 14 and are acted upon at their upper free ends by resilient means in such a manner that the rollers are normally urged inwards towards the axis of the compression chamber. In the embodiment shown, a spring 12 constitutes the resilient means and extends between the upper free ends 11a of the two symmetrically constructed pivoting frames 11. For reasons of clarity of the remaining structure, spring 12 has been broken out of FIG. 3 so that only its ends remain, while FIG. 1 shows only half of its length. Each of the pivoting frames carries a bearing 10 in which is journalled a shaft 13 of one of the upper rollers 7. A movement of the pivoting frames in an outward direction causes the two rollers to swing in an outward direction against the action of the spring 12. The two other rollers can be mounted at both ends on non-pivoting parts. It is of course possible to mount only one of the winding and pressing rollers pivotably. It is also possible to mount any number of the winding and pressing rollers to move resiliently inwards and outwards.

Figure 2:
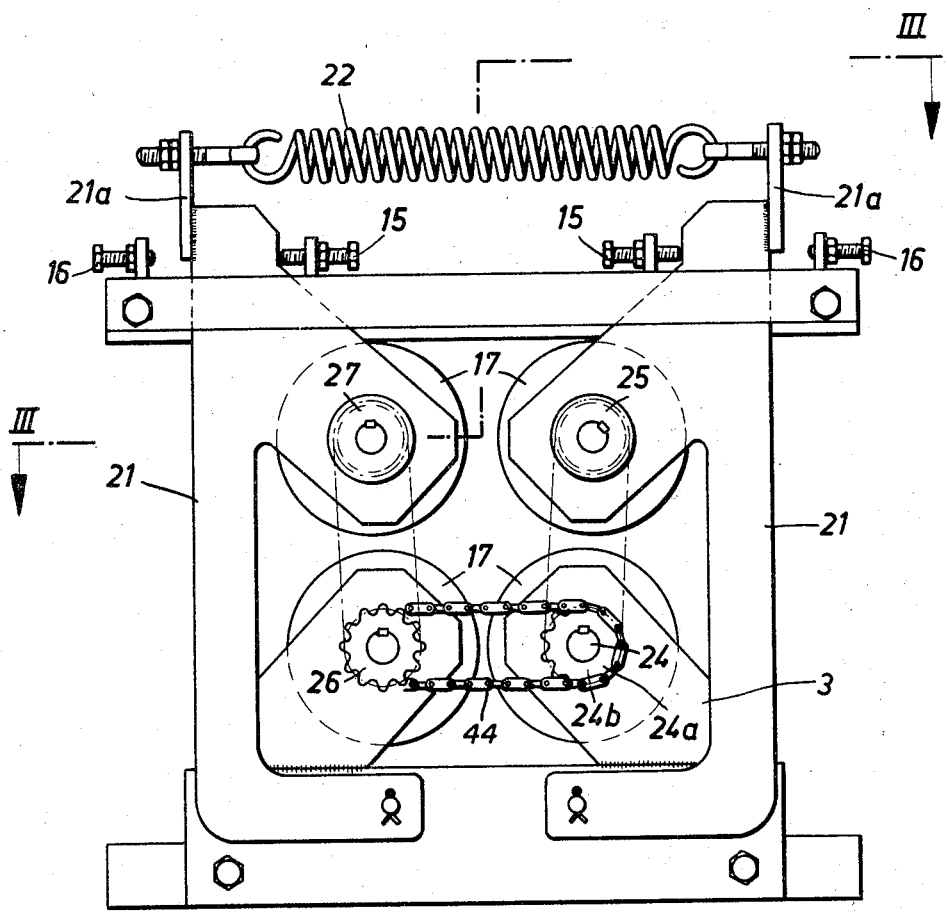
FIG. 2 is an end view of the implement looking in the direction of arrow II in FIG. 1.

Adjoining the winding and compressing part 5 of the implement is the smoothing part 6 which simultaneously serves for consolidation of the rolled bale or strand. In the embodiment shown the smoothing part of the implement comprises cylindrical rollers 17 whose number preferably is equal to the number of winding and compressing rollers—in this case, four. With such an arrangement, each winding and pressing roller is substantially aligned with a smoothing and consolidating roller. The smoothing and consolidating rollers 17 preferably delimit a substantially cylindrical consolidating space or chamber immediately adjoining the compression space of the winding and compression part 5 of the implement. The smoothing and consolidating rollers 17 and the winding and compressing rollers 6 are preferably driven jointly and positively. In the smoothing part of the implement at least one of the smoothing rollers is arranged so that it can give resiliently laterally outwards and inwards. In this embodiment, as illustrated in FIGS. 1 and 2, each of the four rotatable smoothing rollers 17 is hollow. Each is supported at its end remote from the winding and compressing part 5 by a drive shaft 41, hub 42 and web 43, while the other end is supported by means of a bearing 18. In the particular embodiment shown, the bearings 19 of the drive shafts and the bearings 18 of the two upper smoothing and consolidating rollers 17 are also mounted in a pivoting frame. This consists of two arm-like frame pairs 20 and 21 which are similar to the pivoting frames 11 of the winding and compressing station 5. These arm-like frame pairs of the embodiment shown are each connected by a spring 22. The spring 22 of the pair of arms 20 has been entirely broken out of FIG. 1, except for its back end, while the spring 22 of the pair of arms 21 is shown completely in FIG. 2 and with half broken away in FIG. 1. The springs 22 draw the pairs of frame parts together so that the smoothing rollers are urged laterally inwards. In the embodiment shown, the two lower smoothing rollers are ararnged in a fixed manner via mountings of shafts 41 in the end plate 3 and mountings of bearings 18 in the support plate 14.

As shown in FIGS. 1 and 2, the drive for the smoothing rollers 17 and the associated compressing and winding rollers 7 is supplied via a main drive shaft 24. The drive shaft 24 is connected directly with the shaft 41 of one of the smoothing rollers. This shaft carries two sprocket wheels 24a and 24b. One (24a) carries a sprocket chain 44 leading to a sprocket wheel 26 on the other stationary shaft, while the second sprocket wheel (24b) is connected by means of a chain to the moving shaft via the sprocket wheel 25. The sprocket wheel 26 of the second fixed shaft is on the other hand connected via a sprocket drive with a sprocket wheel 27 of the other movable shaft. In this manner the shafts of the movable smoothing rollers 17 can move laterally without the transmission of rotary driving forces to them being interrupted.

The two stationary smoothing and consolidating rollers 17, that is to say, the smoothing and consolidating rollers whose axes are stationary, can be connected directly, with or without a universal joint, with their associated stationary winding and compressing rollers 7. By "associated" is meant the roller 7 which is aligned with the particular roller 17. The driver for each movable smoothing roller 17 and its associated movable winding and pressing roller 7 is transmitted via a jointed shaft 23 which extends substantially over the entire length of the hollow smoothing roller 17. This jointed shaft 23 passes with a substantial radial clearance through the inner race of the bearing 18 and is connected with the shaft 13 of the winding and compressing roller. In this manner it is ensured that the winding and compressing roller and the associated smoothing roller 17 can move independently of each other in a lateral direction without their common positive drive being interrupted.

In the embodiment shown an opening out movement of the movable smoothing rollers 17 is caused by an opening out movement of the winding and compressing rollers 7. In order to provide for this there is a control or coupling means between the associated rollers. Preferably this control means is arranged only to be effective in the opening direction, that is to say in one direction of lateral movement. In the embodiment shown this coupling means is in the form of an entraining means and comprises an entraining pin 28 on each pivoting arm 11. This entraining pin extends into the path of movement of the arms 20 or rather in the path of movement of a plate 20a connected with it and serving for connection with the spring 22. In the embodiment shown the entraining pin 28 is fixed on the plate 11a serving for connecting the arm 11 with the pin. The entraining pin 28 is placed on the inner side so that it only serves to engage the pivoting arm 20 of the smoothing roller in the case of a movement of arm 11 in an outward direction. On the other hand, when reaction pressure in the compression space falls, the pivoting frame 11 can move, without obstruction, in an inward direction under the action of the spring 12, even if the reaction pressure existing in the smoothing part 6 of the implement keeps the pivoting arms 20 on which the smoothing rollers are mounted in the laterally spread position. Conversely, even if the direction of pressure existing in the smoothing part 6 of the implement causes the smoothing rollers to move outwards, the lateral position of the winding and compressing rollers 7 will not be changed.

The compressed, harvested material forming a strand is indicated by reference numeral 30 in FIG. 3. The strand can be cut by a suitable device, not shown, while still in the implement.

The pivoting movement of the pivoting frames and frame parts is adjustable by adjustment screws 15 and 16.

I claim:

1. A roller type compression implement, including compressing and winding roller means comprising mutually facing rollers defining an elongated compressing and winding space between their mutually facing surfaces, into which space fodder is laterally introduced between the mutually facing surfaces of two adjacent rollers, thence to leave as a compacted strand in the direction of elongation; smoothing and consolidating roller means comprising mutually facing rollers defining an elongated smoothing and consolidated space between their mutually facing surfaces, said smoothing and consolidating space being aligned with the compressing and winding space; means for rotatably driving the compressing and winding rollers and the smoothing and consolidating rollers positively together; two rollers of the compressing and winding rollers between which the fodder is introduced and two of the smoothing and consolidating rollers aligned with said two compressing and winding rollers are movably mounted for inward and outward motion and are resiliently biased inwardly; and a means (28) for moving said two smoothing and consolidating rollers apart as said two compressing and winding rollers are moved apart, said means (28) releasing said two smoothing and consolidating rollers as said two compressing and winding rollers are moved together.

2. An implement as claimed in claim 1, said compressing and winding rollers capable of receiving a skew angle relative to the axis of said compressing and winding space, said skew angle capable of adjustment in accordance with the reaction force in the compressing chamber.

3. An implement as claimed in claim 1, said compressing and winding roller means including first movable supports at least for those ends of its movable rollers adjacent the smoothing and consolidating means, said adjacent ends of its movable rollers being journalled in said first supports; said smoothing and consolidating means including second movable supports at least for those ends of its movable roller adjacent the compressing and winding means, said adjacent ends of its movable rollers being journalled in said second supports; said means (28) coupling the movements of said first and second supports, when said first supports are moving outwardly.

4. An implement as claimed in claim 1, each movable smoothing and consolidating roller being hollow and aligned with an associated movable compressing and winding roller; said means for driving comprising separate jointed shafts, one of these passing with substantial radial clearance through substantially the entire length of each movable smoothing and consolidating roller and positively connecting the outer end of said roller to an aligned compressing and winding roller.

5. An implement as claimed in claim 1, said compressing and winding means further comprising a self-aligning bearing means for each movable compressing and winding roller, each movable compressing and winding roller having its end remote from said smoothing and consolidating means journalled in its self-aligning bearing; said compressing and winding means further comprising a pivotably mounted first support for each movable compressing and winding roller, each of said first supports having a roller-journalling location swingable laterally inwards and outwards, each movable compressing and winding roller having its end adjacent said smoothing and consolidating means journalled in its first support at the journalling location thereof; said smoothing and consolidating means further comprising a pivotably mounted second support for each end of each movable smoothing and consolidating roller, each of said second supports having a roller-journalling location swingable laterally inwards and outwards, each smoothing and consolidating roller having its ends mounted in their second supports at the journalling locations thereof.

6. An implement as claimed in claim 5, there being two movable compressing and winding rollers and two movable smoothing and consolidating rollers, each movable compressing and winding roller being aligned with an associated smoothing and consolidating roller, the two compressing and winding rollers being mutually adjoining, the two smoothing and consolidating rollers being mutually adjoining.

7. An implement as claimed in claim 5, further comprising spring means biasing said first and second supports laterally inwards; each movable smoothing and consolidating roller being hollow and aligned with an associated compressing and winding roller; said means for driving comprising separate shafts, one of these passing with substantial radial clearance through each smoothing and consolidating roller and positively connecting to an adjacent, aligned compressing and winding roller.

References Cited

UNITED STATES PATENTS 3,386,373    6/1968    Bushmeyer et al. _____ 100—89

FOREIGN PATENTS 1,024,726    4/1966    Great Britain.

WILLIAM I. PRICE, Primary Examiner

L. G. MACHLIN, Assistant Examiner